(12) United States Patent
Trafton et al.

(10) Patent No.: US 6,917,240 B2
(45) Date of Patent: Jul. 12, 2005

(54) RECONFIGURABLE TOPOLOGY FOR SWITCHING AND CHARGE PUMP NEGATIVE POLARITY REGULATORS

(75) Inventors: Fredrick W. Trafton, Lewisville, TX (US); Tanchu Shih, Dallas, TX (US); Juergen Luebbe, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 27 days.

(21) Appl. No.: 10/647,931

(22) Filed: Aug. 26, 2003

(65) Prior Publication Data

US 2004/0263231 A1 Dec. 30, 2004

Related U.S. Application Data

(60) Provisional application No. 60/438,226, filed on Jan. 6, 2003.

(51) Int. Cl.[7] ................................................. G05F 1/10
(52) U.S. Cl. ...................................... 327/540; 327/536
(58) Field of Search ............................... 323/268, 271, 323/282, 284; 327/530, 534, 535, 537, 538, 539, 540, 541, 543

(56) References Cited

U.S. PATENT DOCUMENTS 6,288,524 B1    9/2001  Tsujimoto
6,304,066 B1   10/2001  Wilcox et al.
6,489,756 B2 * 12/2002  Kanouda et al. ............ 323/284

OTHER PUBLICATIONS

ON Semiconductor CS5111 Data Sheet, Rev. 9 (Semiconductor Components Industries, LLC, Jan. 2001).

"Linear Regulators: Theory of Operation and Compensation", App.Nt. 1148 (Nat'l Semiconductor, 2000).

"Linear and Switching Voltage Regulator Fundamentals" (National Semiconductor).

"DC/DC Conversion without Inductors", APP 725 (Dallas Semiconductor, 2000).

* cited by examiner

Primary Examiner—Jeffrey Zweizig
(74) Attorney, Agent, or Firm—W. Daniel Swayze, Jr.; W. James Brady; Frederick J. Telecky, Jr.

(57) ABSTRACT

A configurable voltage regulator (128) operable in either of two selectable modes or topologies is disclosed. In one disclosed embodiment, the voltage regulator (128) can operate as a charge pump regulator or a switching regulator, to generate a negative polarity regulated voltage. The voltage regulator (128) includes an output driver (80), for example including first and second drive transistors (81A, 81B), that are used in both of the selectable modes.

19 Claims, 3 Drawing Sheets

RECONFIGURABLE TOPOLOGY FOR SWITCHING AND CHARGE PUMP NEGATIVE POLARITY REGULATORS

CROSS REFERENCE TO RELATED APPLICATIONS

This application is related to copending application Ser. No. 10/646,854 entitled, A Reconfigurable Topology for Switching and Linear Voltage Regulators", and filed contemporaneously and commonly assigned with this application. This application claims priority under 35 USC § 119 of provisional application Ser. No. 60/438,226, filed Jan. 06, 2003.

STATEMENT REGARDING FEDERALLY SPONSORED RESEARCH OR DEVELOPMENT

Not applicable.

BACKGROUND OF THE INVENTION

This invention is in the field of semiconductor integrated circuits, and is more specifically directed to voltage regulators implemented in a large scale integrated circuit.

Many modern electronic devices and systems, particularly those performing control and other analog functions, rely upon the generation and use of a stable regulated voltage. For example, integrated circuits for controlling motors, such as disk drive controllers in a desktop or laptop computer system or workstation, require a regulated voltage to supply the voltages required by the digital circuits operating in the disk drive. A stable regulated voltage is required to ensure that the operation of these digital circuits remains stable and consistent over varying temperature conditions, load conditions, power supply voltage levels (particularly in battery-powered systems such as laptop computers), and the like.

Several voltage regulator circuit techniques are well known in the art. One type of voltage regulator is the "switching" regulator. The switching regulator involves an inductor at its output, and is based on the fundamental premise that, while the current through an inductor cannot change instantaneously, the voltage across the inductor can change instantaneously. In general, switching regulators involve a switching device, or pass device, that selectably switches the input voltage source into and out of an inductor. Typically, a pulse-width modulated signal controls the switching device, so that the output voltage is a function of the amplitude of the input voltage and the duty cycle of the switching device. Variations in the configuration of the switching regulator are possible, and achieve a great deal of design flexibility. Switching regulators of the "Buck" type regulate an output voltage that is lower than the input voltage, and switching regulators of the "Boost" type can generate an output voltage that is regulated above the voltage of the input. Other variations of switching regulators generate a regulated voltage that is of a negative polarity relative to the input voltage (e.g., in "Buck-Boost" inverting regulators), or generate multiple regulated output voltages (e.g., in "Flyback" switching regulators). Switching regulators are also often referred to as voltage "converters". In any of these forms, switching regulators typically provide good power conversion efficiency.

The charge pump voltage regulator is also well known in the art. Typical charge pump circuits involve a capacitor that is periodically charged through a diode, again to attain a voltage that depends on the input voltage amplitude and the duty cycle of the switched charging. The diode permits the voltage at the capacitor to exceed that of the input voltage, or to be charged to a voltage that is of the opposite polarity of the input voltage. The isolating function of the diode may alternatively be accomplished by switching transistor pairs in complementary fashion to isolate the capacitor and the pumped voltage. Charge pumps have been used, for example, to generate a negative substrate voltage that sets the back-gate bias of metal-oxide-semiconductor (MOS) transistors in the integrated circuit, thus controlling device performance.

It has been observed that switching regulators are typically more costly to implement than are charge pump regulators. The circuitry for controlling the switching operation is typically more complex than in the charge pump, and involves additional devices and intelligence. In addition, the switching regulator involves the use of an inductor in the circuit. As well known in the art, significant inductance cannot be readily realized in a solid-state integrated circuit, thus requiring an external component to be connected to effect the switching regulator function. Charge pumps are thus often used in place of switching regulators in those circuits and devices in which an inductor is neither available nor desirable.

As evident from this discussion, the selection of an appropriate voltage regulator depends upon several factors including the desired output voltage, the performance of the regulator, and also whether external components such as inductors may be utilized or are desired. Because this tradeoff involves the ultimate end equipment design, the manufacturer of integrated circuits including voltage regulators may be required to produce similar integrated circuits that embody different voltage regulator schemes. In addition, it has been observed that some end equipment manufacturers may utilize the same integrated circuit in multiple implementations, in which different voltage regulator types may be useful. In this situation, the end equipment manufacturer is faced with either maintaining inventory of separate integrated circuits for the separate implementations, or with using a less-than-optimal voltage regulator in some system implementations.

It is known to construct integrated circuits that include multiple voltage regulator topologies. FIG. 1 is an example of such a conventional integrated circuit 10. In this example, integrated circuit 10 includes functional circuitry 12, which is the appropriate logic circuitry, analog circuitry, memory circuitry, or the like that carries out the overall function of integrated circuit 10. In this conventional integrated circuit 10, voltage-regulators 18a, 18b are provided, where voltage regulator 18a is of one type and voltage regulator 18b is of another type. In this conventional arrangement, each of voltage regulators 18a, 18b have dedicated external terminals from integrated circuit 10, as illustrated in FIG. 1. These dedicated terminals output the regulated voltage to other integrated circuits, and are also provided so that the appropriate external components (e.g., an inductor for a switching regulator) may be connected to the corresponding voltage regulators.

Conventional dual voltage regulator integrated circuits (i.e., lacking other functional circuitry 12 as in the case of FIG. 1) are also known. An example of which is the ON SEMICONDUCTOR CS5111 device, available from Semiconductor Components Industries, LLC. The CS5111 device, for example, includes a switching regulator and a linear regulator, and serves as a regulated power supply for electronic devices and systems. In this device, the switching regulator and linear regulator are substantially separately implemented, and have separate dedicated terminals, along the lines of that shown in FIG. 1.

It has been observed, in connection with this invention, that the implementation of separate multiple voltage regulators, as carried out in conventional integrated circuits is quite inefficient. Certain elements within conventional voltage regulators can occupy significant chip area. For example, output drive transistors necessary to rapidly drive external networks of the voltage regulator can be quite large. The implementation of two separate voltage regulators according to conventional techniques is therefore costly in terms of chip area. In integrated circuits having significant functional circuitry, a large number of terminals (inputs, outputs, and common input/output terminals) are often required. In these large scale integrated circuits, the provision of each external terminal can be quite costly, not only in package size and complexity, but also in the chip area required to safely route signals to the external terminal. It is therefore desirable to minimize the number of external terminals for large scale integrated circuits.

BRIEF SUMMARY OF THE INVENTION

It is therefore an object of this invention to provide an integrated circuit that efficiently includes multiple voltage regulators of different types.

It is a further object of this invention to provide such an integrated circuit in which large components are shared among voltage regulators of the different types.

It is a further object of this invention to provide such an integrated circuit in which external terminals are shared among voltage regulators of the different types.

It is a further object of this invention to provide such an integrated circuit in which the selection of one of the multiple voltage regulators can be made by way of a configuration register.

Other objects and advantages of this invention will be apparent to those of ordinary skill in the art having reference to the following specification together with its drawings.

The present invention may be implemented into an integrated circuit having a configurable voltage regulator that is capable of operating as either a switching regulator or a charge pump regulator. The voltage regulator is configured by way of a configuration register. In this example, the same output driver transistors and output drive terminals are used in each of the switching and charge pump regulator configurations, as is the external terminal from which the switching or pass device is driven.

DETAILED DESCRIPTION OF THE INVENTION

The present invention will be described in connection with its preferred embodiment, namely as an integrated circuit having additional functional circuitry, such as a spindle motor controller as used in connection with a computer disk drive, because this invention is contemplated to be especially useful in such an application. However, it will be understood by those skilled in the art having reference to this specification that this invention will also be beneficial in other applications, including integrated circuits of different ultimate functions, and also as a stand-alone voltage regulator device. Accordingly, it is to be understood that the following description is provided by way of example only, and is not intended to limit the true scope of this invention as claimed.

Figure 1:
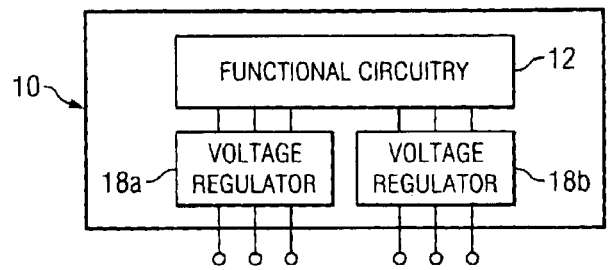
FIG. 1 is an electrical diagram, in block form, of a conventional integrated circuit including multiple voltage regulators.
Figure 2:
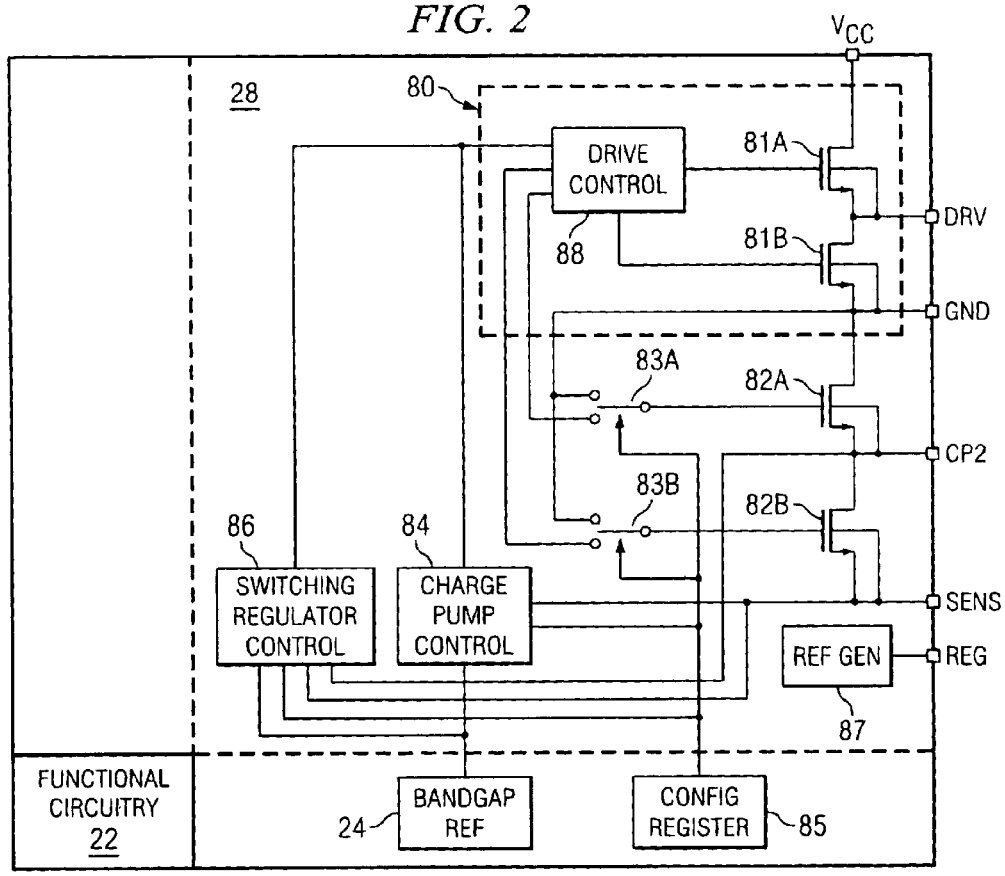
FIG. 2 is an electrical diagram, in schematic and block form, of an integrated circuit constructed according to the preferred embodiment of the invention.

Referring first to FIG. 2, integrated circuit 20 according to the preferred embodiment of the invention will now be described. Integrated circuit 20, in this example, includes functional circuitry 22 for performing a particular device function, and also includes voltage regulator 28 constructed according to the preferred embodiment of the invention. Functional circuitry 22 is logic or other circuitry for performing a desired electronic function, and will be connected to various input, output, and input/output terminals (not shown) of integrated circuit 20 in order to effect that function. Of course, functional circuitry 22 may include such circuitry as used to perform any function suitable for realization in an integrated circuit, and as such the various circuitry implemented within functional circuitry 22 may vary widely. Further in the alternative, functional circuitry 22 may be omitted from integrated circuit 20, for example where the entire function of integrated circuit 20 is a voltage regulator or voltage converter, for example if the function of integrated circuit 20 is to control the power supply of a computer disk drive. It is contemplated that those skilled in the art having reference to this specification will be readily able to implement this invention within an integrated circuit of any function desired.

According to the preferred embodiment of the invention shown in FIG. 2, voltage regulator 28 in integrated circuit 20 is connected to several external terminals DRV, SENS, CP2, REG, and also to power supply terminals VCC, GND. As will become apparent from the following description, voltage regulator 28 drives an external pass or switching transistor from terminal DRV, while terminals SENS, CP2 provide feedback to voltage regulator 28, which in this embodiment of the invention, can be configured either as a charge pump regulator or a switching regulator depending on the contents of a configuration by register. Alternatively, voltage regulator 28 may be configured by the connection of external components to terminals of integrated circuit 20, as described in further detail in copending application Ser. No. 10/646,854 entitled "A Reconfigurable Topology for Switching and Linear Voltage Regulators", filed contemporaneously and commonly assigned with this application and incorporated herein by this reference, or by way of logic circuitry responsive to program or user control. Still further in the alternative, voltage regulator 28 may include different or additional voltage regulator topologies besides the charge pump and switching modes described herein.

In this preferred embodiment of the invention, voltage regulator 28 includes output driver 80, at least portions of which are used in each of the two operating configurations. In this example, output driver 80 includes two n-channel MOS transistors 81A, 81B, having their source/drain paths connected in series between terminal VCC and terminal GND; the gates of transistors 81A, 81B are connected to and controlled by drive control circuitry 88. Terminal DRV of integrated circuit 20 is connected to the node at the source (and body node) of transistor 81A and the drain of transistor 81B, while terminal GND is connected to the source (and body node) of transistor 81B. Drive control circuitry 88 refers to such circuitry as logic inverters and level shifters, as will be shown in connection with the two operating modes of voltage regulator 28.

N-channel MOS transistor 82A has its drain connected to the source of shared transistor 81B, at terminal GND, and has its source connected to terminal CP2. In turn, n-channel MOS transistor 82B has its drain connected to the source of transistor 82A, and its source connected to terminal SENS. The gates of MOS transistors 82A, 82B are connected to the pole of configuration switches 83A, 83B, respectively. Configuration switches 83A, 83B may be implemented in an appropriate manner for the particular technology of the integrated circuit; for example, complementary MOS (CMOS) pass transistors may be used to realize configuration switches 83A, 83B, in the case where the remainder of the integrated circuit is fabricated according to CMOS or BiCMOS technology. Alternatively, configuration switches 83A, 83B may be arranged in any other conventional manner as appropriate for the manufacturing technology. In this embodiment of the invention, each of configuration switches 83A, 83B are controlled by one or more bits in configuration register 85, which is writable under user or program control by other circuitry (not shown) in the integrated circuit. One throw of each of configuration switches 83A, 83B is connected to terminal GND.

In switching regulator mode, configuration register 85 controls configuration switches 83A, 83B to connect the gates of transistors 82A, 82B to terminal GND, disabling these devices in that mode. Conversely, configuration switches 83A, 83B operate to connect the gates of transistors 82A, 82B to drive control circuitry 88 in output driver 80 when voltage regulator 128 is in charge pump mode.

Voltage regulator 28 includes control circuitry for each of its two configurable modes. Charge pump control circuitry 84 is connected to receive feedback inputs from respective throws of configuration switches 83A, 83B and connected to receive a feedback level from terminal SENS; in addition, charge pump control circuitry 84 is connected to bandgap reference circuit 24 to receive a bandgap reference voltage; a soft-start circuit (not shown) may be included between bandgap reference circuit 24 and charge pump control circuitry 84 to effect a ramping up of the output regulated voltage during startup or reset, to avoid output current spikes. The function of charge pump control circuitry 84, when enabled by configuration register 85, is to drive control circuit 88 in output driver 80 to effect the charge pump regulation operation, which will be described below.

Voltage regulator 28 also includes switching regulator control circuit 86, which receives feedback inputs from terminals CP2 and SENS, and which also receives the bandgap reference voltage from bandgap reference circuit 24. When enabled by configuration register 85, switching regulator control circuit 86 issues control signals to drive control circuit 88 in output driver 80. Voltage regulator 128 also includes reference voltage generator circuit 87, which is connected to terminal REG, to provide a reference voltage that is used in the switching regulator configuration of voltage regulator 281.

In operation, the selection of the operating mode of voltage regulator 128 is effected by the external connection of the appropriate devices to terminals DRV, CP2, SENS, and REG, and the writing of the appropriate register word or bits to configuration register 85, to select the desired regulator mode. The writing of configuration register 85 may be carried out by the integrated circuit itself, for example under program control. Alternatively, configuration register 85 may be externally accessible, for example by way of a serial data terminal, to enable writing of configuration register 85 by the device user or the system within which voltage regulator 128 is implemented. Further in the alternative, in place of configuration register 85, logic circuitry may be provided that responds to a bias condition on a configuration terminal, such as described above relative to FIGS. 2, 3a and 3b. In either mode, terminal VCC receives power supply voltage $V_{cc}$, and terminal GND is connected to system ground.

Figure 3A:
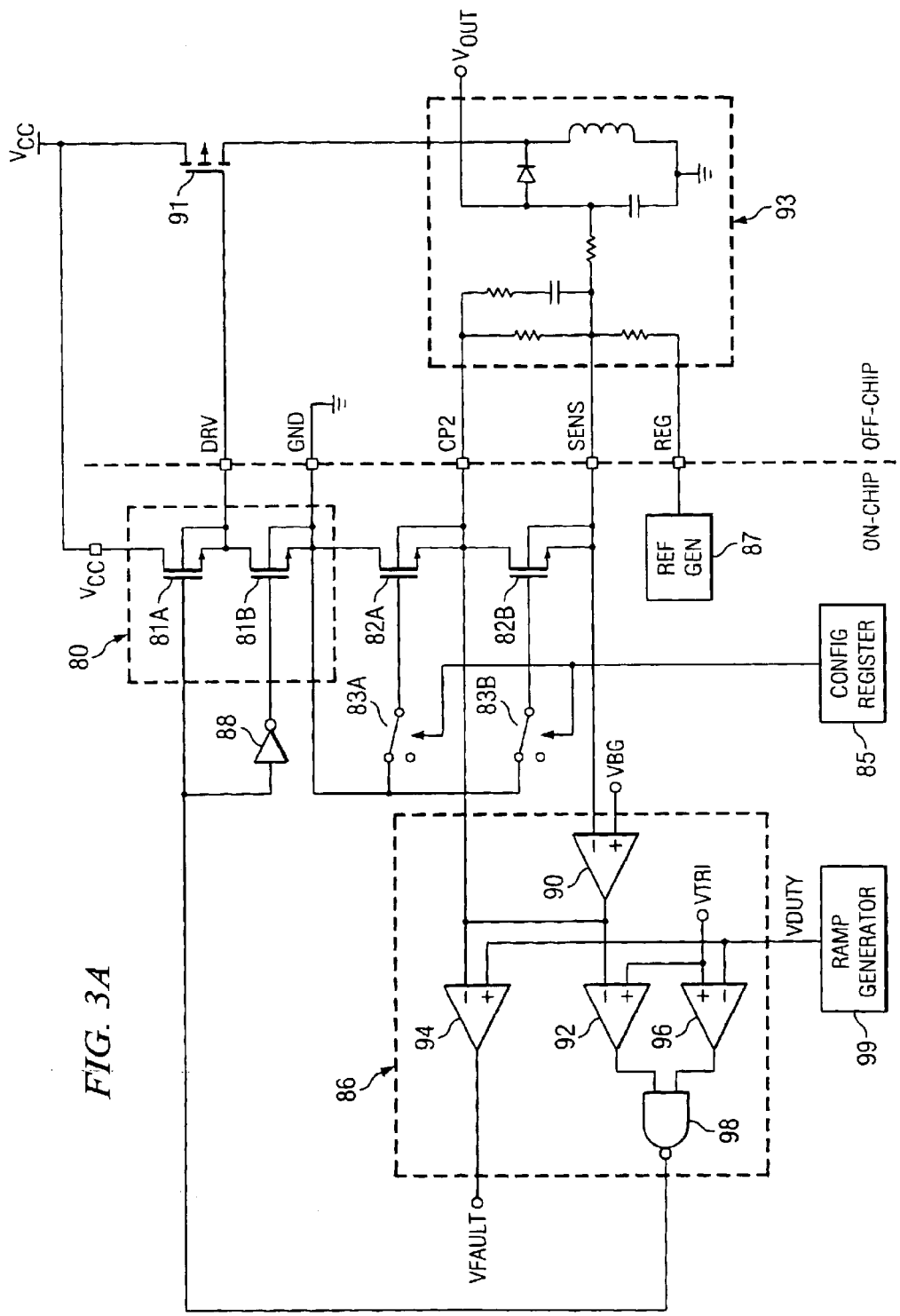
FIG. 3a is an electrical diagram, in schematic and block form, of the voltage regulator in the integrated circuit of FIG. 2, illustrating its configuration as a switching regulator.

FIG. 3a illustrates an example of voltage regulator 128 as configured as a negative switching regulator. Switching p-channel MOS transistor 91 has its source biased to power supply voltage $V_{cc}$, and its gate connected to terminal DRV. The drain of transistor 91 is connected to passive network 93, which includes the appropriate network of an inductor, diode, and output capacitor, and resistor network, by way of which the output voltage at output terminal $V_{out}$ is derived. In this example, because voltage regulator 128 is intended to present a regulated negative polarity voltage, output terminal $V_{out}$ is also connected to the anode of the diode, at the higher voltage end of the inductor in passive network 93. A reference voltage generated by reference generator 87 is applied to passive network 93 from terminal REG, as shown. Considering that voltage regulator 128 is a negative voltage regulator, this reference voltage is a positive voltage applied to a voltage divider between reference generator 87 and output terminal $V_{out}$ as shown, with terminal SENS driven by this voltage divider. Feedback voltages at terminal SENS and also at terminal CP2 are applied to switching regulator control 86, which in turn controls output driver 80 and thus controls the current driven by switching transistor 91.

In this configuration, as shown in FIG. 3a, transistors 81A, 81B of output driver 80 are driven in complementary fashion from switching regulator control circuit 86 through the operation of an inverter. Transistors 82A, 82B each have their gates connected to ground through configuration switches 83A, 83B, and are thus disabled in this mode.

In operation, while transistor 91 is on, current is sourced from power supply $V_{cc}$ into the inductor of passive network 93. When transistor 91 turns off, the current through the inductor cannot change instantaneously; as such, this current must be provided through the diode. This forces the voltage at output terminal $V_{out}$ to a negative voltage. The switching on and off of transistor 91 thus serves to regulate this negative voltage, in the well-known manner for negative switching regulators.

Switching regulator control circuit 86 according to this preferred embodiment of the invention includes error amplifier 90, which receives, at a negative input, the voltage at terminal SENS and compares this voltage against the bandgap reference voltage VBG, which is received at its positive input from bandgap voltage regulator circuit 24. The output of error amplifier 90 is applied to the negative input of comparator 92. The positive input of comparator 92, according to this embodiment of the invention, receives a triangular voltage waveform VTRI. In one example, waveform VTRI varies from a low voltage (e.g., 0.43 volts) to a high voltage (e.g., 1.3 volts) at a frequency of on the order of 600 kHz to 1.2 MHz. Accordingly, the output of comparator 92 resembles a pulse-width-modulated (PWM) signal, at a duty cycle corresponding to the voltage output from error amplifier 90.

Figure 4:
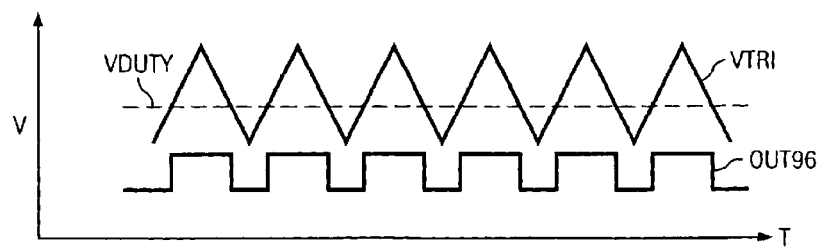
FIG. 4 is a timing diagram illustrating the relationship of a reference waveform and a duty cycle control signal in the operation of the voltage regulator circuit of FIG. 2, in its switching regulator mode, according to the preferred embodiment of the invention.

Comparator 96 also receives waveform VTRI at its positive input, and receives a control voltage VDUTY from ramp generator 99 at its negative voltage. This control voltage VDUTY ramps, on power-up or reset, from a high level to a level within the range of waveform VTRI, and sets a maximum duty cycle limit for voltage regulator 128. FIG. 4 illustrates this exemplary arrangement in the steady state, at which the output (OUT96) of comparator 96 is at a high logic level during such time as waveform VTRI exceeds control voltage VDUTY. In one example, control voltage VDUTY ramps down to a steady-state level corresponding to a maximum duty cycle of 65%. As will now be described, comparator 96 is used to gate the duty cycle of the regulator.

According to this embodiment of the invention, the outputs of comparators 92, 96 are applied to inputs of NAND gate 98, the output of which is applied to output driver 80 and which thus controls the drive of transistor 91. In this embodiment of the invention, transistor 91 is p-type, as mentioned above, and transistors 81A, 81B in output driver 80 operate as a non-inverting buffer. NAND gate 98 produces a low level output, which will turn on transistor 91 by turning on transistor 81B and turning off transistor 81A, only when both of comparators 92, 96 are issuing high level outputs. Conversely, NAND gate issues a high level output, turning on transistor 81A and turning off transistor 81B and thus turning off transistor 90, when the output of either of comparators 92, 96 is low. In this way, comparator 96 gates the operation of output driver 80, and thus controls the maximum duty cycle of voltage regulator 128. The ramping of control voltage VDUTY from a high level toward its eventual steady state level, on reset or power-up, thus operates as a "soft-start", keeping voltage regulator 128 from excessive duty cycle operation as it enters regulation.

In this preferred embodiment of the invention, fault comparator 94 receives the error voltage from error amplifier 90 at one input, and receives control voltage VDUTY at another input. Fault comparator 94 is thus operable to produce a signal if the error-voltage from error amplifier 90 falls short of control voltage VDUTY, which indicates that the voltage at output terminal $V_{out}$ cannot reach its regulated level.

In operation from a startup condition, the voltage at output terminal $V_{out}$, and that at terminal SENS are not yet driven negative. Error amplifier 90 produces a negative output (the voltage at terminal SENS exceeding bandgap voltage VBF until its reaches its regulated level), which in turn causes comparator 92 to issue a positive output at a high duty cycle. Meanwhile, control voltage VDUTY is ramping from a high level toward its eventual maximum duty cycle level, permitting only a relatively low duty cycle signal to be produced from NAND gate 90 regardless of the error voltage from error amplifier 90. Transistors 81A, 81B thus turn on transistor 91 at this low, but increasing, duty cycle, which applies current into the inductor of passive network 93 accordingly at this duty cycle, resulting in an increasingly negative voltage at output terminal $V_{out}$. Once the negative voltage at output terminal $V_{out}$ reaches its desired level, the duty cycle of the positive output form comparator 92 begins to shrink, such that transistor 91 is turned only as necessary to maintain the regulated voltage. Conversely, if voltage regulator 128 is unable to drive the desired negative voltage at output terminal $V_{out}$, for example if the load conditions are not correct, a fault condition will be produced by comparator 94.

Portions of the circuitry used in the charge pump regulator mode are disabled when voltage regulator 128 is configured as a switching regulator. In this example, configuration register 85 controls configuration switches 83A, 83B to connect the gates of transistors 82A, 82B, respectively, to ground potential at terminal GND, disabling those devices. Charge pump control circuitry 84 is also disabled by configuration register 85 in this mode, while switching regulator control circuit 86 is enabled by configuration register 85.

Figure 3B:
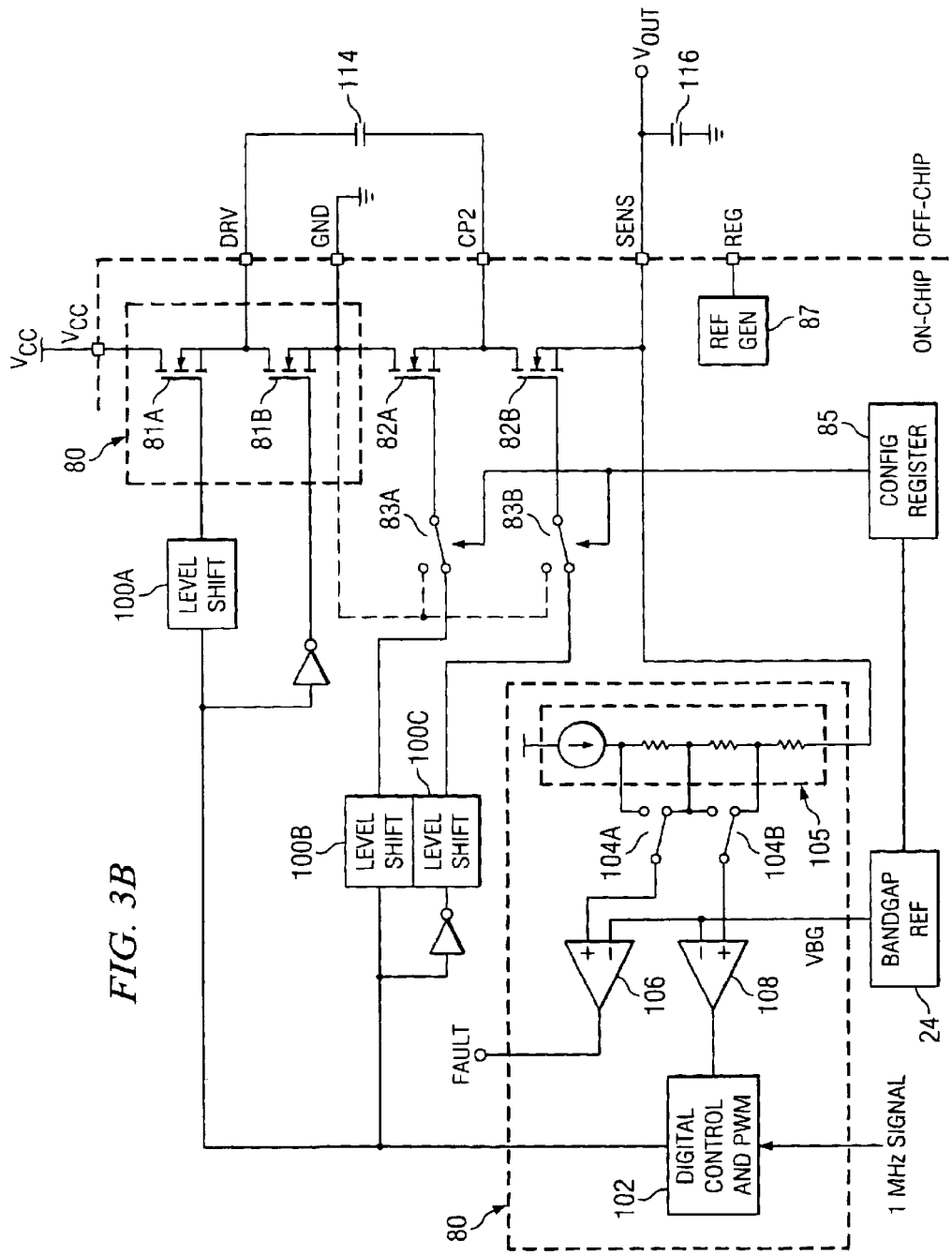
FIG. 3b is an electrical diagram, in schematic and block form, of the voltage regulator of FIG. 2, illustrating its configuration as a charge pump regulator.

Referring now to FIG. 3b, the configuration of voltage regulator 128 as a charge pump regulator according to this embodiment of the invention, will now be described. In this mode, the external components include capacitor 114, which is a flyback capacitor connected across terminals DRV and CP2, and output capacitor 116, which is connected between terminal SENS, at which output terminal $V_{out}$ is driven, and system ground. Terminal GND is connected to system ground, and terminal VCC is connected to power supply voltage $V_{cc}$; terminal REG is simply not connected, as the reference voltage from reference generator 24 is not used in the charge pump configuration.

In this operating mode, configuration register 95 is written with the appropriate bits or data word to cause switches 83A, 83B to connect the gates of respective transistors 82A, 82B to drive control circuit 88 in output driver 80. Switching regulator control circuit 86 is disabled in this mode. Charge pump control circuit 84 includes the appropriate conventional circuitry for controlling the operation of voltage regulator 128 as a charge pump regulator, as will now be described. Additionally, various level shift circuits 100A, 100B, 100C (i.e., output drive control 88 of FIG. 2) are typically enabled in this example, so that the gate drive of the transistor pairs 81, 82 is sufficient to fully turn on these devices in operation.

As shown in FIG. 3b, terminal SENS is connected to voltage divider 105, as its lowest voltage. Voltage divider 105 includes a chain of resistors (three resistors, in this example) that are biased from a current source so that the voltage drop across each resistor is constant, regardless of the voltage at terminal SENS. According to this embodiment of the invention, taps in voltage divider 105 are connected to selection switches 104A, 104B. In this way, voltage regulator 128 operates to produce a user-selectable regulated voltage (e.g., –3.0 volts or –3.3 volts). Selection switches 104A, 104B may be controlled by configuration register 85 as shown, or by a voltage applied to an external terminal, or under program control or the like.

Comparator 108 receives the voltage at a selected tap of voltage divider 105 via selection switch 104B, at a positive input, and receives the bandgap voltage VBG at a negative input. The output of comparator 108 is connected to digital control 102, which receives a periodic signal (e.g., at 1 MHz) and derives a pulse-width-modulated (PWM) signal to be applied to output driver transistors 81A, 81B, 82A, 82B from this signal in response to the output of comparator 108.

Charge pump regulator control circuitry 84 also includes fault comparator 106, which has a positive input receiving the voltage at another tap of voltage divider 105 via selection switch 104A, and that has a negative input receiving the bandgap voltage VBG. The tap of voltage divider 105 applied to fault comparator 106, in this embodiment of the invention, is necessarily at a higher voltage than the tap applied to comparator 108, considering that a resistor is present between these two taps in either setting of selection switches 104A, 104B. As such, fault comparator 106 will issue a fault signal if the negative voltage generated at output terminal $V_{out}$ cannot reach its regulated level. For example, the differential voltage between the taps of voltage divider 105 applied to selection switches 104A, 104B can be maintained at a fixed differential (e.g., 0.3 volts), so that the fault signal is generated by fault comparator 106 if the tap voltage applied to comparator 108 cannot come within 0.3 volts of its desired regulated voltage.

In operation, digital control 102 issues a pulse width modulated signal to the gates of transistors 81A, 81B, 82A, 82B in response to the output of comparator 108. Level shifters 100 convert the PWM signal to the appropriate levels adequate to fully turn on transistors 81, 82. In charge pump fashion, transistors 81A, 82A are turned on (with transistors 81B, 82B off), to first charge flyback capacitor 114 to a positive voltage relative to ground. Transistors 81B, 82B are then turned on and transistors 81A, 82B are turned off, which connects the positively charged plate of capacitor 114 to ground through transistor 81B, and connects the previously grounded plate to output terminal $V_{out}$, at the top plate of load capacitor 116. Because the voltage across capacitor 114 cannot instantaneously change, and because the positively charged plate of capacitor 114 is at ground, a negative voltage appears at the top plate of capacitor 116. This process is repeated at the desired pulse width modulation rate (e.g., 1 MHz), until the desired negative voltage at terminal SENS and thus at output terminal $V_{out}$ is attained, at which point the modulation of transistors 81, 82 is adjusted accordingly through the operation of comparator 108 and digital control 102.

According to this embodiment of the invention, a configurable voltage regulator is provided, by way of which the voltage regulator can operate either as switching regulator or as a charge pump. In this embodiment of the invention, large output driver devices (e.g., transistors 81A, 81B) are used in both the charge pump and switching regulator modes, enabling the implementation of both topologies of voltage regulator circuits in a configurable fashion within the same integrated circuit. In addition, this permits the integration of these output driver devices within the integrated circuit itself, reducing the number of external components required, especially for the charge pump topology in which only the external flyback and output capacitors are required. This particular configuration is also especially useful in generating a regulated negative polarity voltage, and as such this configuration may be included in the same integrated circuit as the configurable positive polarity voltage regulator described above, if desired.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. An integrated circuit, comprising:
   a plurality of terminals including an output terminal and at least one input terminal; and
   a configurable voltage regulator operable in a first mode or a second mode, comprising:
   output driver circuitry, having an output coupled to the output terminal;
   a first regulator made control circuit, having at least one input coupled to a first input terminal, having an output coupled to the output driver circuitry;
   a second regulator mode control circuit, having at least one input coupled to a second input terminal, and having an output coupled to the output driver circuitry; and
   configuration circuitry, for selectably enabling the first and second regulator mode control circuits responsive to a configuration signal,
   wherein the configuration circuitry comprises:
   a writable configuration register, coupled to the at least one configuration switch, for receiving and storing configuration data indicating the selected mode.

2. An integrated circuit, comprising:
   a plurality of terminals including an output terminal and at least one input terminal; and
   a configurable voltage regulator operable in a first mode or a second mode, comprising;
   output driver circuitry, having an output coupled to the output terminal;
   a first regulator mode control circuit, having at least one input coupled to a first input terminal, having an output coupled to the output driver circuitry;
   a second regulator mode control circuit, having at least one input coupled to a second input terminal, and having an output coupled to the output driver circuitry; and
   configuration circuitry, for selectably enabling the first and second regulator mode control circuits responsive to a configuration signal,
   wherein the first regulator mode control circuit comprises switching regulator control circuitry, comprising:
   an error amplifier having a first input coupled to a first input terminal, having a second input receiving a reference voltage, and having an output;
   a first comparator receiving the output of the error amplifier at one input, and receiving a reference voltage at another input, and having an output coupled to the output driver, for providing an output signal responsive to a comparison of the error amplifier output to the reference voltage.

3. The integrated circuit of claim 2, wherein the reference voltage is a triangle waveform.

4. The integrated circuit of claim 3, wherein the switching regulator control circuitry further comprises:
   a second comparator, receiving the reference voltage at one input and a control voltage at another input;
   logic circuitry, having inputs coupled to the output of the first and second comparators, for generating an output driver control signal to the output driver responsive to the outputs of the first and second comparators.

5. The integrated circuit of claim 2, further comprising:
   a fault amplifier, having an input coupled to the output of the error amplifier, for generating a fault signal responsive to the signal at the error amplifier output.

6. The integrated circuit of claim 2, wherein the output driver circuitry comprises:
   first and second transistors having conduction paths connected in series, and having the output terminal connected to a node between their conduction paths, and having control terminals coupled to the output of the first comparator.

7. The integrated circuit of claim 6, further comprising:
   output drive control circuitry, coupled to the output of the first comparator and to the control terminals of the first and second transistors, for controlling the first and second transistors in a complementary fashion.

8. The integrated circuit of claim 2, further comprising:
third and fourth transistors, having conduction paths connected in series and to a second output terminal, and having control terminals; and
wherein the configuration circuitry further comprises:
first and second configuration switches, for applying a disabling voltage to the control terminals of the third and fourth transistors when the switching regulator control circuitry is enabled.

9. An integrated circuit, comprising:
a plurality of terminals including an output terminal and at least one input terminal; and
a configurable voltage regulator operable in a first mode or a second mode, comprising:
output driver circuitry, having an output coupled to the output terminal:
a first regulator mode control circuit, having at least one input coupled to a first input terminal, having an output coupled to the output driver circuitry;
a second regulator mode control circuit, having at least one input coupled to a second input terminal, and having an output coupled to the output driver circuitry; and
configuration circuitry, for selectably enabling the first and second regulator mode control circuits responsive to a configuration signal.
wherein the second regulator mode control circuit comprises charge pump regulator control circuitry, comprising:
an error amplifier, having a first input coupled to said second input terminal, and having a second input receiving a reference voltage, and having an output; and
pulse width modulation circuitry, having an input coupled to the output of the error amplifier, and having an output coupled to the output driver circuitry, for controlling the output driver circuitry responsive to the output of the error amplifier.

10. The integrated circuit of claim 9, wherein the charge pump regulator control circuitry further comprises:
a voltage divider, coupled to the input terminal, for applying a first sense voltage to the first input of the error amplifier responsive to the voltage at the input terminal.

11. The integrated circuit of claim 10, wherein the voltage divider provides a plurality of taps;
wherein the first input of the error amplifier is coupled to a first tap of the voltage divider;
wherein the charge pump regulator control circuitry further comprises:
a fault comparator, having a first input coupled to a second tap of the voltage divider and a second input coupled to the reference voltage, for generating a fault signal responsive to a comparison of the voltage at the second tap of the voltage divider and the reference voltage.

12. The integrated circuit of claim 11, the charge pump regulator control circuitry further comprises:
configuration switches, for coupling selected ones of the taps of the voltage dividers to the fault comparator and error amplifier responsive to the configuration circuitry.

13. The integrated circuit of claim 9, further comprising:
third and fourth transistors, having conduction paths connected in series and to a second output terminal, and having control terminals; and
wherein the configuration circuitry further comprises:
first and second configuration switches, for coupling the control terminals of the third and fourth transistors to the pulse width modulation circuitry responsive to the charge pump regulator control circuitry is enabled.

14. A method of generating a regulated voltage, comprising the steps of:
configuring a configurable voltage regulator in an integrated circuit into either a switching regulator mode or a charge pump regulator mode, the configurable voltage regulator comprising output drive circuitry having outputs at first and second drive terminals, the output drive circuitry including first and second transistors coupled to the first drive terminal;
in the switching regulator mode:
connecting a drive transistor to the first drive terminal;
connecting an external network including an inductor to the transistor, the external network producing the regulated voltage;
connecting an error amplifier of the voltage regulator to the external network, so that the error amplifier receives a voltage corresponding to the regulated voltage; and
disabling third and fourth transistors coupled to the second drive terminal;
in the charge pump regulator mode:
connecting a flyback capacitor to the first and second drive terminals;
enabling third and fourth transistors coupled to the second drive terminal, the fourth transistor coupled between the second drive terminal and a sense terminal;
connecting a load at the sense terminal;
coupling an error amplifier of the voltage regulator to the sense terminal, so that the error amplifier receives a voltage corresponding to the regulated voltage;
responsive to the configuring step configuring the configurable voltage regulator in the switching regulator mode:
coupling the output of the error amplifier to switching regulator control circuitry; and
coupling the output of the switching regulator control circuitry to the output drive circuitry so that the first and second transistors are driven by the switching regulator control circuitry responsive to the error amplifier; and
responsive to the configuring step configuring the configurable voltage regulator in the charge pump regulator mode:
coupling the output of the error amplifier to pulse width modulation circuitry; and
operating the pulse width modulation circuitry responsive to the error amplifier output to drive the first, second, third, and fourth transistors.

15. The method of claim 14, wherein the configuring step comprises:
writing configuration information to a configuration register.

16. The method of claim 14, further comprising, in the switching regulator mode:
comparing an output of the error amplifier to a time-varying waveform in the switching regulator control circuitry to generate a time-varying signal corresponding to the comparing; and
coupling the time-varying signal to the first and second transistors.

17. The method of claim 16, further comprising, in the switching regulator mode:

generating a maximum duty cycle signal; and gating the coupling of the time-varying signal to the first and second transistors with the maximum duty cycle signal.

18. The method of claim 16, further comprising, in the switching regulator mode:

generating a fault signal responsive to the output of the error amplifier exceeding a fault level.

19. The method of claim 14, further comprising, in the charge pump regulator mode:

coupling the sense terminal to a voltage divider having a plurality of taps, wherein a first one of the taps is coupled to the error amplifier; and generating a fault signal responsive to a voltage at a second one of the taps exceeding a fault level.

* * * * *